United States Patent Office
3,160,612
Patented Dec. 8, 1964

3,160,612
DETERGENT COPOLYMER
William T. Stewart, El Cerrito, Frank A. Stuart, Orinda, and Warren Lowe, Berkeley, Calif., assignors to California Research Corporation, San Francisco, Calif., a corporation of Delaware
No Drawing. Original application June 10, 1959, Ser. No. 819,223, now Patent No. 3,048,544, dated Aug. 7, 1962. Divided and this application Jan. 26, 1962, Ser. No. 169,128
2 Claims. (Cl. 260—78)

This invention relates to a novel lubricant composition, and it is particularly directed to the provision of a lubricant composition which is adapted to be employed in internal combustion engines.

With the refinements now being made in automotive and other internal combustion engines, a great deal of attention is being directed to the provision of a lubricant which will permit the engine to be operated at a high level of efficiency over a long period of time. The primary function of the lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls and other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs, are also partially attributable in many cases to the lubricant and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof, and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major source of such deposits or their precursors lies in the various aldehydes, acids, oxy-acids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have heretofore been successfully employed on a commercial scale are organic, metal-containing compounds such as calcium petroleum sulfonate, calcium cetyl phosphate, calcium octyl salicylate, calcium phenyl stearate, the barium salts of wax-substituted benzene sulfonate, or the potassium salt of the reaction product of phosphorus pentasulfide and polybutene. Various of these detergents act by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible, particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymeric materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder wall is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly, it forms still another object of this invention to provide a lubricant composition containing a metal- or mineral-free additive which effectively decreases the wear experienced by piston rings and cylinder walls, particularly during periods before the engine has become thoroughly warmed to operating temperatures.

The present invention is based on the discovery that certain copolymers, which contain no metal component and therefore are substantially free of any ash-forming tendency, have the ability to impart excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives of the present invention effectively reduce the wear experienced by piston rings and cylinder wall surfaces even under the most unfavorable operating conditions such as are experienced during the starting and warming up of the engine. These additives have the advantage that they do not combine chemically with the various polymer precursors which are solubilized or dispersed in the oil, nor apparently do they act by a neutralization reaction in counteracting the effect of the various acidic fuel combustion by-products. Accordingly, they are capable of giving excellent protection against engine deposits and wear over extended operating periods. It should also be noted that the copolymeric additives of this invention are noncorrosive to the various bearing metals employed in engines.

Since the additives of the present invention differ in kind from any heretofore proposed for either detergent or antiwear purposes, it would have been surprising to discover that they were effective for either of these purposes. However, that they possessed not one but both of said qualities was altogether unexpected and could not have been predicted.

The polymeric additives of the present invention are polymers of monomers comprising (A) polymerizable oil solubilizing compounds having a single ethylenic linkage and containing a monovalent hydrocarbon group of from 4 to 30 carbon atoms and (B) N-substituted alkyl imides of α,β-ethylenically unsaturated-α,β-dicarboxylic acids of from 4 to 12 carbon atoms each in which the alkyl groups attached to the acids contain from 1 to 4 carbon atoms each and in which the imide nitrogen atom is attached to an amino substituted alkyl group of from 2 to 7 carbon atoms, said polymer having a molecular weight of at least 50,000 and said monomers being present in the polymer in the ratio of about 1 to 20 monomer units of the oil solubilizing monomer (A) for each monomer unit of the imide monomer (B).

Representative polymers coming within the scope of the present invention are, for example, those of dodecyl methacrylate, and N-dimethylaminopropyl maleimide; octadecyl acrylate and the imide of maleic acid and tetraethylene pentamine; allyl stearate and the imide of maleic acid and diethylene triamine; dodecyl methacrylate, octadecyl methacrylate and the imide of citraconic acid and 3-dimethylaminopropyl amine; and dodecyl methacrylate and the imide of itaconic acid and diethylene triamine.

The oil-solubilizing monomer portion of the polymeric additives of this invention can be any compound having at least one ethylenic linkage ($>C=C<$), together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl cyclohexyl, 4-ethylcyclohexyl, or the like, or an alkenyl radical such as oleyl, ricinoleyl, or the like, wherein the ethylenic double bond has substantially no polymerizing tendency. Oil solubilizing monomers of this general character are well known in the art and are frequently employed as the oil solubilizing portion of polymers which are added to lubricating oils to improve the viscosity index and pour point characteristics thereof. They include such materials as olefins and ethylenically unsaturated ethers, esters, ketones, aldehydes, and the like.

The oil solubilizing monomers of component (A) may also be illustrated by the following general formula:

$$R_1(G')_{n'}CH=CH(G)_nR_2$$

in which $R_1$ and $R_2$ are members of the groups consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

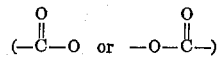

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing monomer compounds which can be employed to form the copolymeric additives of the present invention include the following:

OLEFINS

| | |
|---|---|
| Hexene-1 | Octadecene-1 |
| 2-ethylhexene-1 | 4-octylcyclohexene-1 |
| Di- and triisobutylene | 3-phenylhexadecene-1 |
| Tripropylene | p-Octylstyrene |
| Dodecene-1 | Vinylcyclohexane |
| Hexadecene-1 | 2-hexadecylbutadiene-1,3 |
| Cyclohexene | p-Tertiarybutylstyrene |

ETHERS

| | |
|---|---|
| Vinyl n-butyl ether | Propenyl 2-ethylhexyl ether |
| Vinyl 2-ethylhexyl ether | |
| Allyl n-butyl ether | Crotyl n-octyl ether |
| Allyl isobutyl ether | Isopropenyl dodecyl ether |
| Allyl cyclohexyl ether | 1-decenyl butyl ether |
| Allyl 4,4,8,8-tetramethyl-docosyl ether | 1-eicosenyl decyl ether |
| | Vinyl p-octylphenyl ether |
| Methallyl n-hexyl ether | Methallyl p-tert.butylphenyl ether |
| Methallyl n-decyl ether | |
| Methallyl 2-ethylhexyl ether | 1-decenyl p-cetylphenyl ether |
| Methallyl octadecyl ether | 1-decenyl 2-phenylbutyl ether |

ESTERS

Vinyl caproate
Vinyl palmitate
Vinyl oleate
Allyl caprylate
Allyl laurate
Allyl oleate
Allyl palmitate
Allyl stearate
Allyl 2-ethylhexanoate
Allyl ricinoleate
Allyl esters of babassu acids
Allyl esters of lard acids
Allyl naphthenate
Methallyl caproate
Methallyl naphthenate
Methallyl ricinoleate
Methallyl p-octylbenzoate
Methallyl oleate
Methallyl cyclohexane carboxylate
Methallyl palmitate
Crotyl oleate
Crotyl naphthenate
α-Methylcrotyl palmitate
1-propenyl naphthenate
1-propenyl elaidate
Dodecyl acrylate
Hexadecyl methacrylate
Isobutyl α-decylacrylate
Vinyl p-n-octyl benzoate
Allyl 3,5-diisobutyl benzoate
Cyclohexyl methacrylate
Cyclohexyl 2-dodecenoate
Decyl vinylacetate
Isooctyl α-chloroacrylate
p-Isoamylphenyl 2-hexadecenoate
4-p-tolylbutyl 2-octadecenoate
Undecyl cinnamate
Methylcyclohexyl 2-ethyl-2-hexenoate
5-ethyldocosyl crotonate
Octadecyl isocrotonate
n-Butyl-2-eicosenoate
p-Tert.amylphenyl octadecyl maleate
p-Hexadecylphenyl 2-ethylhexyl maleate
o-Tolyl 2-octadecylcyclohexyl maleate
o-Nonylphenyl-hexadecyl maleate
Dihexadecyl maleate
Dimethylcyclohexyl maleate
Mono-2-ethylhexyl maleate
Di-2-ethylhexyl maleate
Di-dodecyl maleate
Di-dodecyl mesaconate
Di-dodecyl citraconate
o-Tolyl octadecyl itaconate
Mono-hexadecyl itaconate
Isopropenyl palmitoleate
1-decenyl laurate
1-hexadecenyl myristate Although any of the oil solubilizing compounds described above will give effective copolymer compositions for lubricant compositions in accordance with the present invention, higher alkyl esters of α,β-unsaturated monocarboxylic acids of from 3 to 6 carbon atoms and fatty acid esters of unsaturated alcohols of from 2 to 6 carbon atoms having alkyl groups of from 4 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Representative alcohols are vinyl alcohol, allyl alcohol, methallyl alcohol, crotyl alcohol and the like. Even more desirable are the alkyl esters of acrylic and methacrylic acids containing from 8 to 30 carbon atoms in the alkyl groups, since they are found to provide highly superior polymers for the lubricant compositions of the invention and are obtainable in commercial quantities.

Various copolymers employing representative oil solubilizing monomers of the foregoing types were prepared to illustrate the oil solubilizing effect of the monomers on the resultant copolymers. The solubility of the copolymers in oil and their suitability as lubricating oil additives were demonstrated by incorporating the copolymers into lubricating oils. The lubricant compositions thus obtained were tested to determine their detergency and deposition properties. The results of these tests are given in Table I below.

In the tests the base oil, unless otherwise indicated, is a solvent-refined, wax-free, SAE-30 grade mineral lubricating oil having a viscosity index of 85 which is derived from California waxy crude. Various amounts of the copolymers are incorporated into the oil as indicated in terms of percent by weight.

The Piston Varnish Ratings of the lubricant compositions were obtained by the standard FL-2 test procedure as set out in the June 21, 1948, report of the Coordinating Research Council. In this test the lubricating oil compositions were tested as crankcase lubricants in a 6-cylinder Chevrolet engine, using a low-grade gasoline especially prone to cause engine deposits. At the end of each test the engine was dismantled and the detergency or deposition properties of the lubricant compositions were determined by examining the engine deposits on the piston and visually rating them as to the amount of piston varnish present. The Piston Varnish Ratings of the compositions are given in numerical terms on a scale of 0–10 with "10" representing the complete absence of deposits.

The deposition characteristics of the lubricant compositions containing the copolymeric additives were also determined in the Lacquer Deposition Test. In this test typical engine fuel combustion products were passed into the lubricant compositions and the ability of the lubricant compositions to solubilize and retain the lacquer-forming materials was observed by weighing the amount of lacquer deposits formed on a fresh iron catalytic surface for a standard period of time. The lacquer deposit of the lubricant composition is taken as the number of milligrams deposit on the metal surface, and may be correlated directly to the Piston Varnish Rating obtained in the standard FL-2 test procedure outlined in the above paragraph.

*Table I*

| Lubricant Composition | Ratio of (1) Monomer to (2) Monomer to (3) Monomer | Piston Varnish Rating | Lacquer Deposit (Milligrams) | Piston Varnish Rating (Estimated From Lacquer Deposit) |
|---|---|---|---|---|
| Base Oil alone | | 3.0 | 850 | |
| 2.8%: (1) Dodecyl methacrylate (2) N,N'-di-2-hydroxyethyl maleamide | 20/1 | | 450 | 5.0 |
| 2.8%: (1) Dodecyl methacrylate (2) Allyl stearate (3) Maleic anhydride | 20/1/1 | | 405 | 5.2 |
| 1.5%: (1) Dodecyl methacrylate (2) N-(2-hydroxyethyl) methacrylamide | 7/1 | 6.3 | | |
| *3.0%: (1) Tridecyl methacrylate (2) Octadecyl methacrylate (3) Monododecyl ether of hexadecaethylene glycol ª methacrylate | 10/6/1 | 8.4 | | |
| 2.5%: (1) Allyl stearate (2) Didodecyl maleate (3) Di-(hydroxyethyl) ethylene-diamine salt of monodecyl maleate | 5/5/2 | 5.5 | | |
| 2.8%: (1) Vinyl ethylhexoate (2) Itaconic acid | 15/1 | | 500 | 4.5 |

Table I—Continued

| Lubricant Composition | Ratio of (1) Monomer to (2) Monomer to (3) Monomer | Piston Varnish Rating | Lacquer Deposit (Milligrams) | Piston Varnish Rating (Estimated From Lacquer Deposit) |
|---|---|---|---|---|
| 2.8%: (1) Vinyl sterate (2) Maleic anhydride (3) Monododecyl ether of pentaethylene glycol [b] methacrylate (4) Methacrylamide | 30/1/2/1 | | 325 | 6.0 |
| 2.5%: (1) Allyl stearate (2) Ethylene glycol monooleate monomaleate (3) Mono-N,N'-di(2-hydroxyethyl) ethylenediamine maleate (salt) | 5/4/1 | 4.0 | | |
| 2.8%: (1) Octadecene (2) Monododecyl maleate (3) Monopentaerythritol maleate | 2/1/1 | | 500 | 4.5 |
| 2.8%: (1) Hexene-1 (2) Dodecyl methacrylate (3) Methacrylic acid (4) Monododecyl ether of eicosaethylene glycol [c] methacrylate | 25/25/1/4 | | 400 | 5.5 |
| 2.8%: (1) Di-2-ethylhexyl fumarate (2) Octadecene-1 (3) Crotonic acid (4) Monotridecyl ether of decaethylene glycol [d] methacrylate | 25/25/8/2 | | 570 | 4.0 |
| 2.8%: (1) Allyl ethyl ether (2) Vinyl stearate (3) Itaconic acid (4) Monododecyl ether of decaethylene glycol [d] crotonate | 14/50/7/3 | | | |
| 3.0%: (1) Vinyl 2-ethylhexyl ether (2) Tetradecylphenyl maleate (3) Dodecyl maleate (4) Maleic acid | 6/3/1/2 | 4.6 | | |
| 1.5%: (1) Dodecyl acrylate (2) Monododecyl ether of decaethylene glycol [d] acrylate (3) Acrylic acid | 780/9/1 | 5.6 | | |
| 1.5%: (1) Hexadecyl styrene (2) Methacrylic acid | 58/1 | 5.9 | | |

\* In 140 Neutral Mineral Lubricating Oil from solvent-refined waxy California crude.
[a] Polyethylene glycol of 704 M. W.
[b] Polyethylene glycol of 220 M. W.
[c] Polyethylene glycol of 880 M. W.
[d] Polyethylene glycol of 440 M. W.

From the above test data it will be seen that all of the various oil solubilizing monomers representative of the aforementioned types were effective in the production of useful, copolymeric lubricating oil additives which are capable of preventing deposits from lubricant compositions under typical engine operating conditions. These monomers, as previously described, constitute a definite, recognized class of compounds which have been used heretofore in the art in the production of polymeric lubricating oil additives of the nonpolar type, such as V.I. improvers and pour point depressants. Although the results demonstrate beyond any reasonable doubt the suitability of the different oil solubilizing monomers within the terms of the description in the production of oil soluble copolymers, it should be understood that the efficacy of each individual class of copolymers as detergents is primarily dependent upon the particular polar or functional group in the so-called polar monomer and its relationship to the rest of the copolymer.

Since the functionality of the individual polar groups differs and is largely empirical in nature, no conclusion is intended to be drawn concerning equivalency of the various copolymeric lubricating oil additives employed as detergents in this illustration. The polar groups of the particular class copolymers of the compositions of this invention and their balance or relationship to the remainder of the copolymers are more fully discussed in the disclosure which follows, along with additional examples of the invention.

The imide monomer components of the polymeric additives of this invention are the derivatives of alkylene polyamines and aliphatic unsaturated dicarboxylic acids of from 4 to 12 carbon atoms or their anhydrides such as maleic acid, maleic anhydride, citraconic acid, itaconic acid and the like, wherein the two carbonyl carbon atoms of the acid are linked to a single substituted nitrogen atom.

Suitable imide monomers are readily prepared by reacting the unsaturated dicarboxylic acid with the alkylene polyamine as hereinafter described. Heating is desirable and an excess of acid is preferably employed to reduce formation of diamides.

A preferred group of imide monomers is made up of those of the type defined in the foregoing paragraph but where the dicarboxylic acid is one of the $\alpha,\beta$-unsaturated-$\alpha,\beta$-dicarboxylic variety, for example, maleic acid, citraconic acid or the like. Such compounds have the structural formula

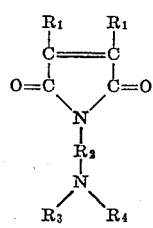

where the $R_1$'s, which can be the same as or different from one another, are hydrogen atoms or alkyl groups of not more than 4 carbon atoms, where $R_2$ is an alkylene group of from 1 to 7 carbon atoms and $R_3$ and $R_4$ are hydrogen, alkyl groups of from 1 to 7 carbon atoms or amino substituted alkyl groups, the amino substituents being alkylene diamines, and polyalkylene polyamines in which the alkylene groups contain from 1 to 7 carbon atoms.

Presently preferred are the imides of maleic acid and alkylene diamines and polyalkylene polyamines in which the alkylene groups contain from 2 to 4 carbon atoms and the polyalkylene polyamines contain from 2 to 8 alkylene amine units. The amino nitrogen groups of such preferred compounds may be substituted by alkyl radicals of from 1 to 4 carbon atoms.

In preparing the polymers of the invention, it is only necessary that conditions be chosen which will insure polymerization and the formation of polymers having the requisite oil solubility. The oil solubilizing (A) monomers vary somewhat in their solubilizing characteristics. Thus, in some cases it is possible to obtain polymers which are soluble in oil by employing oil solubilizing (A) and nitrogenous (B) monomer ratios as low as 1:1; while in others it is advantageous to raise this ratio to much higher values, e.g., about 20:1, in order to obtain a polymer product having optimum oil solubility characteristics. As a general rule, however, polymers having excellent detergent and anti-wear characteristics, together with the requisite oil solubility (which should be at least 0.5 and is preferably as great as 10% by weight of the lubricant composition) can be prepared by employing oil solubilizing (A) monomer to polar (B) monomer ratios of from about 3:1 to 15:1, and such a range is preferably employed wherever possible.

The polymers of this invention can be prepared by one or more of a variety of different methods known in the art. As regards the reactants per se, there can be employed a given oil solubilizing monomer, or a mixture of such monomers, together with an imide nitrogen monomer or a combination of such monomers. However, it is also possible to employ monomer reactants other than those which finally compose the polymer. Thus, in the case where ester monomers are to form a part of the polymer, one may employ, instead of the ester, the corresponding unsaturated alcohol or unsaturated acid, with the balance of the ester monomer unit being supplied by subjecting the copolymer intermediate to an appropriate esterification treatment. Again, instead of employing the monomeric imide to form the copolymer, one can employ the corresponding unsaturated acid or acid anhydride, or the acid chloride, or a half ester of the acid, for example, with the desired imide then being formed after the polymerization reaction is complete. Thus, a polymer of dodecyl methacrylate and N-dimethylaminopropyl maleimide can be formed by first polymerizing equimolar amounts of dodecyl methacrylate and maleic anhydride, and then forming the desired imide linkages by treating the polymer with dimethylaminopropyl amine under appropriate conditions. Again by a practice of this same method, but using only a minor percentage of the amount of dimethylaminopropylamine required for complete amidization, there is formed a polymer made up of at least three different monomer units, namely, dodecyl methacrylate, maleic anhydride, and N-dimethylaminopropyl maleamide. As the remaining carboxyl or incipient carboxyl (anhydride) groups in the latter polymer are then converted to one or more of various ester, cyano, or amide linkages, or the like, it is obvious that many other monomer units can readily be formed in the polymer.

In any event, the present invention contemplates those polymers which are soluble to the extent of at least 0.5% by weight in hydrocarbon mineral oils, and which contain at least one N-aminoalkyl-substituted imide monomer unit for each twenty oil solubilizing monomer units present in the copolymer, and at most one such nitrogenous monomer unit for each monomer unit of the oil solubilizing compound.

Having selected the desired monomeric reactants, the copolymer of this invention can be prepared by conventional bulk, solution or emulsion methods of addition polymerization in the presence of an addition polymerization initiator. Preferably, however, the polymerization is effected in an inert organic solvent such as benzene, toluene, xylene or petroleum naphtha in the presence of a free radical-liberating type of initiator such as a peroxy compound, for example, benzoyl peroxide, acetyl peroxide, tert.-butyl hydroperoxide, di-tert. butyl peroxide, dibenzoyl peroxide, or di-tert. amyl peroxide, or an azo initiator such as 1,1'-azodicyclohexanecarbonitrile, or α,α'-azodiisobutyronitrile. The catalyst or polymerization initiator, can be employed in an amount of from about 0.1 to 10%, with a preferred range being from about 0.25 to 2%. If desired, the catalyst can be added in increments as the reaction proceeds. Likewise, additional portions of the solvent can also be added from time to time in order to maintain the solution in a homogenous condition. The temperature of polymerization varies from about 75 to 150° C., with the optimum temperature depending on the solvent selected, the concentration of monomers present therein, the catalyst selected, and the time of the reaction. Much the same conditions prevail when the polymerization is effected in bulk rather than in the presence of an inert solvent.

The polymer additives of the invention have apparent molecular weights as determined by standard light scattering methods of at least 50,000. For practical purposes, molecular weights of from 100,000 to 1,000,000 are most suitable from the standpoint of viscosity and other physical characteristics of the polymeric additives.

In a preferred application of the polymeric lubricating oil detergent additives of the present invention in mineral lubricating oil, it has been noted that a certain optimum relationship between the total number of aliphatic carbon atoms to polar groups within the molecule appears to exist. Evidence has been obtained that for a given concentration the copolymer compositions containing a ratio of aliphatic carbon atoms to polar groups within the range of from 50 to 225, preferably 75 to 125, appear to embrace the optimum composition for deposit reduction effectiveness. In determining this apparent balance between the polar and nonpolar constituents, the aliphatic carbon atoms to be considered are the following:

$$CH_3-, \ CH_2-$$

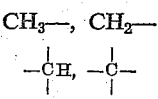

and excluding aromatic ring carbon atoms or the carbon atom of the carbonyl groups. As polar groups, the following representative radicals are included: —OH (either acid, alcohol or phenol), $$-NH_2, \ -NH$$

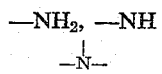

and an acid anhydride or imide group as a single unit.

Although this concept of polymer compositions appears to correlate generally with their performance in all of the oils of lubricating viscosity, there may be additional composition factors which alter the effect of these improving agents in various types of lubricating oil systems and service. However, on the basis of these assumptions, it becomes evident that variations in the aliphatic carbon to polar ratio and hence performance efficacy may be accomplished by the choice of the acid derivative radical and degree of neutralization in the modification of polar component (B).

Typical methods for preparing the polymers which can be employed with success as detergents and anti-wear oxidants in lubricant compositions are given in the following examples:

EXAMPLE I

This example shows the preparation of alkyl methacrylate maleic anhydride polymer (80/1 ratio).

A 2-liter, round-bottomed, three-neck flask was fitted with a mechanical stirrer, reflux condenser, dropping funnel, and burette for catalyst addition and maintained under an inert atmosphere. A charge consisting of 316 g. of alkyl methacrylate (95%) in which the alkyl groups are a mixture of 60% by weight dodecyl and 40% by weight octadecyl groups, 5 g. of maleic anhydride, and 200 g. of methyl ethyl ketone was placed in the flask. The dropping funnel was charged with 316 g. of the alkyl methacrylate and 211 g. of methyl ethyl ketone. The catalyst was a 2% solution of bis-azoisobutyronitrile (AIBN) in methyl ethyl ketone.

The contents of the flask were brought to boiling, and an initial charge of 1.5 ml. of catalyst was added. Thereafter, the catalyst level was maintained at 0.01% by further addition at 15-minute intervals. The monomer was slowly added at the rate of 315 ml. the first hours, 150 ml. the second, 93 ml. the third, 32 ml. the fourth, and the remainder the fifth hours. At the end of 5 hours, the reaction was stopped by the addition of quinone. The polymer was precipitated with acetone and twice precipitated from benzene with acetone. The yield was about 480 g. of polymer. This was in the form of a 68.8% solution in benzene.

EXAMPLE II

This example shows the preparation of maleimide polymer.

A 2-liter, round bottomed flask fitted with a thermometer, mechanical stirrer, reflux condenser, and dropping funnel was charged with 100 g. of tetraethylenepentamine and 200 g. of benzene. Over a period of two hours, 250 g. of a solution of the polymer prepared above and 300 g. of benzene were slowly added with stirring. The resulting solution was then heated under reflux for one hour. The benzene was stripped off until the temperature of the flask contents rose to 290° C., and the flask was then allowed to cool. The excess amine was removed by precipitation of the polymer three times from benzene with methanol. The polymer was dissolved in benzene, added to 300 g. of 150 neutral oil, and stripped at 5 mm. pressure. This concentrate was used to prepare blends for engine and carbon black peptization tests.

Other maleimide polymers having a variety of N-amino substituted alkyl imide groups were prepared by the procedure illustrated above and used in the preparation of blends for tests.

The structure of these compounds was substantiated by infra red analysis. The twin carbonyl peaks associated with succinic anhydride are no longer present. A carbonyl absorption band consistent with an imide structure is present, as well as the absence of any absorption due to amide or salt form.

EXAMPLE III

This example shows the preparation of polymer of alkyl methacrylate, polyethylene glycol methacrylate, and maleic anhydride.

A 2-liter, round-bottomed, three-neck flask was fitted with a mechanical stirrer, reflux condenser, and burette for catalyst addition and maintained under an inert atmosphere. A charge consisting of 514 g. of alkyl methacrylate (95%) in which the alkyl groups are a mixture of 60% by weight dodecyl and 40% by weight octadecyl groups, 140 g. of polyethylene glycol methacrylate having a molecular weight of about 1800, 10 g. of maleic anhydride, and 220 g. of methyl ethyl ketone was placed in the flask. The catalyst was a 4% solution of bis-azoisobutyronitrile in methyl ethyl ketone.

The contents of the flask were brought to boiling, and an initial charge of 0.85 ml. of catalyst was added. The catalyst level was maintained at 0.01% by slow addition of catalyst.

At the end of 5¾ hours, the reaction was stopped by the addition of quinone. The polymer was precipitated with methanol and twice precipitated from benzene with methanol and dissolved in benzene to make a 50% solution. Analysis showed the ratio of alkyl methacrylate-polyethylene glycol methacrylate maleic anhydride to be 50:1:1.5.

EXAMPLE IV

This example shows the preparation of polymer of alkyl methacrylate, polyethylene glycol methacrylate and imide of maleic anhydride and tetraethylene pentamine.

A 2-liter, round-bottomed flask fitted with a thermometer, mechanical stirrer, reflux condenser, and dropping funnel was charged with 50 g. of tetraethylene pentamine and 200 g. of benzene. The dropping funnel was charged with 200 g. of the above prepared 50% solution of alkyl methacrylate, polyethylene glycol methacrylate, maleic anhydride polymer and 300 g. of benzene. The polymer solution was added over a period of two hours. The resulting solution was heated under reflux for two hours. The benzene was stripped off until the temperature of the flask rose to 280° C., and the flask was then allowed to cool. The excess amine was removed by precipitation of the polymer three times from benzene with methanol. The polymer was dissolved in benzene, added to 300 g. of 150 neutral oil, and stripped at 120° C. at 5 mm. pressure. This concentrate was used to prepare blends for engine and carbon peptization tests.

In general, excellent detergent and anti-wear properties can be imparted to lubricating oils by dissolving therein a quantity of from about 0.1 to 10% by weight of the polymers of the type described above, although a preferred range is from about 0.5 to 5% by weight. The polymeric additives of this invention can be used with good effect in the case of any one of a wide variety of oils of lubricating viscosity, or if blends of such oils. Thus, the base oil can be a refined Pennsylvania or other paraffin base oil, a refined naphthenic base oil, or a synthetic hydrocarbon or non-hydrocarbon oil of lubricating viscosity. As synthetic oils, there can be used alkylated waxes and similar alkylated hydrocarbons of relatively high molecular weight, hydrogenated polymers of hydrocarbons, and the condensation products of chlorinated alkyl hydrocarbons with aromatic compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymer such as, for example, the acetate of the 2-ethyl-hexanol-initiated polymer of propylene oxide. Other important classes of synthetic oils include the various esters as, for example, di(2-ethylhexyl) sebacate, tricresyl phosphate and silicate esters. If desired, the oil can be a mixture of mineral and synthetic oils.

While satisfactory lubricant compositions can be obtained by adding to the base oil employed only one or more of the polymeric additives of the type described above, it also falls within the purview of this invention to provide lubricant compositions which contain not only such polymers, but also other additives such as pour point depressants, oiliness and extreme pressure agents, antioxidants, rust and corrosion inhibiting agents, blooming agents, thickening agents, and/or compounds for enhancing the temperature-viscosity characteristics of the oil. The present invention also contemplates the addition to the lubricant composition (particularly when the amount of polymer employed is relatively small) of auxiliary detergents and/or antiwear agents.

The efficacy of polymeric additives of the type described above as detergents and anti-wear agents in lubricating oils is illustrated by data from a number of tests. In the tests from which the data is obtained the base oil unless otherwise specified, is a solvent-refined, wax-free SAE-30 grade mineral lubricating oil having a viscosity index of 85 which is derived from California waxy crude. Various amounts of the polymeric additives are incorporated into the oil as noted in terms of percent by weight.

In the Carbon Black Peptization Test, the low temperature detergency of the oils tested is measured by determining the ability of the oils to suspend finely divided carbon particles, which is in direct correlation to the ability of the oil to solubilize and retain typical engine fuel deposits and precursors thereof. In the tests, 0.5 gram of lampblack are suspended in 100 ml. of light hydrocarbon oil along with 1% of the polymer in a graduated glass cylinder. The suspension is observed over a period of time of several hours to determine the amount of sedimentation.

In the test where the Piston Varnish Ratings are obtained, the same lubricating oil as above but containing 12 millimols per kilogram of zinc butyl hexyl dithiophosphate corrosion inhibitor is tested as the crankcase lubricant in a 6-cylinder Chevrolet engine using a low grade gasoline especially prone to cause engine deposits, the conditions being those defined in the standard FL-2 test procedure as described in the June 21, 1948, report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the Piston Varnish Rating. This value is obtained by visually rating (on a scale of 0 to 10, with 10 representing the absence of any deposit) the amount of deposit on each piston skirt and averaging the individual ratings so obtained for the various pistons. Under the conditions of this test, a Piston Varnish Rating of 4.5 is indicative of satisfactory performance, though preferably this rating should be 5 or above. In the case of the base oil alone without the addition of any additives, it is found that the Piston Varnish Rating is approximately 3.0. On the other hand, as indicated by the data presented in Table II below, when the base oil is compounded with the indicated amounts of a copolymer, greatly superior results are obtained.

This application is a division of Stewart, Stuart and Lowe U.S. patent application Serial No. 819,223, filed June 10, 1959, now U.S. Patent 3,048,544, on Lubricant Composition; which is a continuation-in-part of Stewart, Stuart and Lowe application Serial No. 563,206, filed February 3, 1956, and now U.S. Patent No. 2,892,786; which in turn is a continuation-in-part of Stewart, Stuart and Lowe application Serial No. 312,392, filed September 30, 1952 and now abandoned; Stuart, Lowe and Stewart application Serial No. 328,152, filed December 26, 1952 now abandoned; and Lowe, Stewart and Stuart application Serial No. 363,679, filed June 23, 1953, now abandoned.

We claim:

1. A polymer of (A) polymerizable oil-solubilizing compounds selected from the group consisting of alkyl methacrylates and alkyl acrylates having 8 to 18 carbon atoms in the alkyl group and vinyl and allyl esters of fatty acids having 8 to 18 carbon atoms in the fatty acid group, (B) the imide of maleic anhydride and a polyamine selected from the group consisting of 3-dimethyl amino propylamine, diethylene triamine and tetraethylene pentamine, and (C) polyethylene glycol methacrylate having a molecular weight of about 1800, said polymer having a molecular weight from about 100,000 to about 1,000,000 as determined by light scattering methods, and said monomers being present in the polymer in the ratio of from about 1 to 20 monomer units of the oil-solubilizing monomer (A) for each monomer unit of the imide monomer (B), said polymer having a solubility in lubricating oil of at least 0.5% by weight.

2. A polymer of (A) alkyl methacrylates having 8 to 18 carbon atoms in the alkyl group, (B) the imide of maleic anhydride and tetraethylene pentamine, and (C) polyethylene glycol methacrylate having a molecular weight of about 1800, said polymer having a molecular weight of about 100,000 to about 1,000,000 as determined by light scattering methods, and said monomers being present in the polymer in the ratio of from about 1 to 20 monomer units of the oil-solubilizing monomer (A) for each monomer unit of the imide monomer (B), said polymer having a solubility in lubricating oil of at least 0.5% by weight.

*Table II*

| Polymer | Monomer Ratio | Carbon Black, Percent Suspension | | | FL-2 Av. PVR |
|---|---|---|---|---|---|
| | | ½ Hr. | 2 Hr. | 5 Hr. | |
| Alkyl* methacrylate | | 10 | 6 | 6 | |
| Alkyl methacrylate-maleic anhydride | 20-1 | 20 | 6 | 5 | |
| | 40-1 | 30 | 5 | 4 | |
| Alkyl methacrylate-maleic anhydride-3-dimethyl amino propylene amine | 10.1 | 100 | 100 | 100 | |
| | 20-1 | 100 | 100 | 100 | |
| Alkyl methacrylate-maleic anhydride-diethylene triamine | 20-1 | 100 | 100 | 100 | |
| | 40-1 | 100 | 100 | 100 | |
| Alkyl methacrylate-maleic anhydride-tetraethylene pentamine | 20-1 | 100 | 100 | 100 | |
| | 40-1 | 100 | 100 | 100 | 6 |
| | 80-1 | 100 | 100 | 100 | 5 |
| Polymer of Example IV | | 100 | 100 | 100 | 7 |

*60% by weight dodecyl and 40% by weight octadecyl.

From the tests of the foregoing table, it will be seen that each of the illustrative compositions containing the polymeric lubricating oil additives according to the invention possesses improved lubricating properties compared to the base oils alone.

References Cited in the file of this patent

UNITED STATES PATENTS 2,743,260    Tawney    Apr. 24, 1956
3,048,487    Minsk et al.    Aug. 7, 1962